US010783245B2

(12) United States Patent
Hassanshahi et al.

(10) Patent No.: US 10,783,245 B2
(45) Date of Patent: Sep. 22, 2020

(54) FEEDBACK-DIRECTED STATIC ANALYSIS

(71) Applicant: Oracle International Corporation, Redwood Shores, CA (US)

(72) Inventors: Behnaz Hassanshahi, Brisbane (AU); Benjamin Barslev Nielsen, Aarhus V (DK)

(73) Assignee: Oracle International Corporation, Redwood Shores, CA (US)

( * ) Notice: Subject to any disclaimer, the term of this patent is extended or adjusted under 35 U.S.C. 154(b) by 88 days.

(21) Appl. No.: 16/206,562

(22) Filed: Nov. 30, 2018

(65) Prior Publication Data

US 2020/0175163 A1 Jun. 4, 2020

(51) Int. Cl.
*G06F 21/56* (2013.01)
*G06F 21/57* (2013.01)
*G06F 11/34* (2006.01)
*G06F 11/36* (2006.01)

(52) U.S. Cl.
CPC ........ *G06F 21/563* (2013.01); *G06F 11/3419* (2013.01); *G06F 11/3604* (2013.01); *G06F 21/577* (2013.01); *G06F 2201/81* (2013.01); *G06F 2221/033* (2013.01)

(58) Field of Classification Search
CPC .. G06F 21/563; G06F 21/577; G06F 11/3419; G06F 11/3604; G06F 2201/81; G06F 2221/033
See application file for complete search history.

(56) References Cited

U.S. PATENT DOCUMENTS

| 8,499,353 B2* | 7/2013 | Lockhart | G06F 11/3612 726/22 |
| 10,445,516 B1* | 10/2019 | Mao | G06F 21/6218 |
| 2005/0108562 A1* | 5/2005 | Khazan | G06F 21/566 726/23 |
| 2005/0273861 A1* | 12/2005 | Chess | G06F 21/577 726/25 |

(Continued)

OTHER PUBLICATIONS

Avik Chaudhuri et al., "Fact and Precise Type Checking for JavaScript"; pp. 1-30; Aug. 30, 2017 (30 pages).

(Continued)

*Primary Examiner* — Sher A Khan
(74) *Attorney, Agent, or Firm* — Ferguson Braswell Fraser Kubasta PC

(57) ABSTRACT

A method may include obtaining a list of to-be-analyzed modules of an application. The list of to-be-analyzed modules may include a first module including a statement. The method may further include generating initial results by performing an initial iteration of a static analysis that analyzes each module in the list of to-be-analyzed modules, determining, by the initial iteration, that the statement is a function call to a second module not in the list of to-be-analyzed modules, in response to the determination, assigning, by the initial iteration, an abstract value to a memory address associated with the statement, adding, to the abstract value, a tag including a name of the second module, updating, using the tag and the initial results, the list of to-be-analyzed modules, and generating next results by performing a next iteration of the static analysis that analyzes each module in the updated list of to-be-analyzed modules.

17 Claims, 8 Drawing Sheets

(56) References Cited

U.S. PATENT DOCUMENTS

| | | | | |
|---|---|---|---|---|
| 2011/0219359 A1* | 9/2011 | Gupta | ............... | G06F 9/44 |
| | | | | 717/124 |
| 2012/0304158 A1* | 11/2012 | Li | ............... | G06F 8/75 |
| | | | | 717/132 |
| 2015/0013011 A1* | 1/2015 | Brucker | ............... | G06F 21/577 |
| | | | | 726/25 |
| 2015/0371047 A1* | 12/2015 | Mendelev | ............... | H04L 63/1433 |
| | | | | 726/25 |
| 2016/0300065 A1* | 10/2016 | Bang | ............... | G06F 21/52 |
| 2017/0351597 A1* | 12/2017 | Baset | ............... | G06F 8/75 |
| 2018/0011778 A1* | 1/2018 | Shavro | ............... | G06F 11/3676 |

OTHER PUBLICATIONS

Simon Holm Jensen et al., "Type Analysis for JavaScript"; Lecture Notes in Computer Science, vol. 5673; LNCS; pp. 238-255; Aug. 2009 (18 pages).

Vineeth Kashyap et al., "JSAI: A Static Analysis Platform for JavaScript"; Proceedings of the 22nd ACM SIGSOFT International Symposium on Foundations of Software Engineering; pp. 121-132; Nov. 16-21, 2004 (12 pages).

Cristian-Alexandru Staicu et al., "Synode: Understanding and Automatically Preventing Injection Attacks on Node.js"; Network and Distributed Systems Security (NDSS) Symposium; pp. 1-15; Feb. 18-21, 2018 (15 pages).

* cited by examiner

FEEDBACK-DIRECTED STATIC ANALYSIS

BACKGROUND

Static dataflow analysis is a popular technique for detecting code injection vulnerabilities. However, when applied to dynamic programming languages (e.g., JavaScript), classic dataflow analysis based on coarse-grained abstractions is insufficiently precise to be useful in practice. Abstract interpretation techniques designed with abstractions close enough to program semantics have been shown to be more precise and suitable for analyzing dynamic languages. However, abstract interpretation techniques are typically slow, and do not scale well to large codebases. For example, abstract interpretation of Node.js applications does not scale well due to the large number of NPM (node package manager) modules used by Node.js applications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining a list of to-be-analyzed modules of an application. The list of to-be-analyzed modules includes a first module including a statement. The method further includes generating initial results by performing an initial iteration of a static analysis that analyzes each module in the list of to-be-analyzed modules, determining, by the initial iteration, that the statement is a function call to a second module not in the list of to-be-analyzed modules, in response to the determination, assigning, by the initial iteration, an abstract value to a memory address associated with the statement, adding, to the abstract value, a tag including a name of the second module, updating, using the tag and the initial results, the list of to-be-analyzed modules, and generating next results by performing a next iteration of the static analysis that analyzes each module in the updated list of to-be-analyzed modules.

In general, in one aspect, one or more embodiments relate to a system including a repository configured to store code including an opaque function, a memory coupled to a computer processor, a repository configured to store a list of to-be-analyzed modules of an application. The list of to-be-analyzed modules includes a first module including a statement. The repository is further configured to store a second module not in the list of to-be-analyzed modules, an abstract value, and a tag including a name of the second module. The system further includes a code analyzer, executing on the computer processor and using the memory, configured to generate initial results by performing an initial iteration of a static analysis that analyzes each module in the list of to-be-analyzed modules, determine, by the initial iteration, that the statement is a function call to the second module, in response to the determination, assign, by the initial iteration, the abstract value to a memory address associated with the statement, add the tag to the abstract value, update, using the tag and the initial results, the list of to-be-analyzed modules, and generate next results by performing a next iteration of the static analysis that analyzes each module in the updated list of to-be-analyzed modules.

In general, in one aspect, one or more embodiments relate to a non-transitory computer readable medium including instructions that, when executed by a computer processor, perform: obtaining a list of to-be-analyzed modules of an application. The list of to-be-analyzed modules includes a first module including a statement. The instructions further perform: generating initial results by performing an initial iteration of a static analysis that analyzes each module in the list of to-be-analyzed modules, determining, by the initial iteration, that the statement is a function call to a second module not in the list of to-be-analyzed modules, in response to the determination, assigning, by the initial iteration, an abstract value to a memory address associated with the statement, adding, to the abstract value, a tag including a name of the second module, updating, using the tag and the initial results, the list of to-be-analyzed modules, and generating next results by performing a next iteration of the static analysis that analyzes each module in the updated list of to-be-analyzed modules.

Other aspects of the invention will be apparent from the following description and the appended claims.

DETAILED DESCRIPTION

Figure 1A:
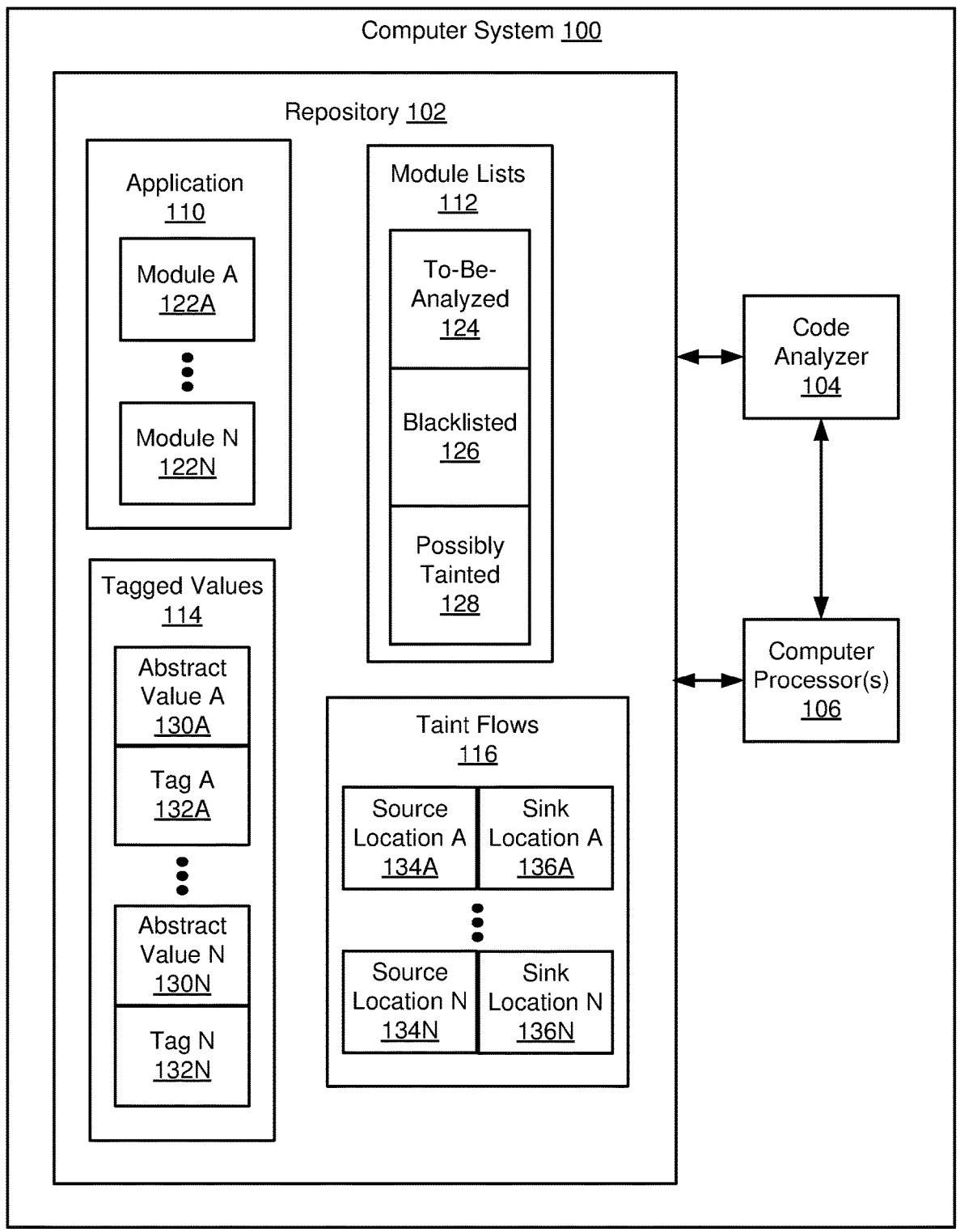
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system, and computer-readable medium for feedback-directed static analysis. In one or more embodiments, the analysis determines which modules of an application to over-approximate, in order to improve the efficiency and scalability of the analysis, without sacrificing precision. In other words, modules may be over-approximated when possible, and modules may be analyzed precisely when necessary. In one or more embodiments, the analysis uses abstract interpretation, where abstract values are assigned to memory addresses associated with statements of the application. Tags may be used to represent information regarding which modules are responsible for which over-approximated values. Tags may be used when determining whether an over-approximated value has caused a significant loss of precision, thus necessitating the addition of a previously over-approximated module to a list of to-be-analyzed modules. In one or more embodiments, the analysis proceeds through a series of iterations, where the current iteration provides feedback to the next iteration by updating the list of to-be-analyzed modules and a list of blacklisted modules. For example, a module may be added to the list of blacklisted modules when the module consumes a disproportionate amount of the analysis time.

FIG. 1A shows a computer system (100) in accordance with one or more embodiments of the invention. As shown in FIG. 1A, the computer system (100) includes a repository (102), a code analyzer (104), and one or more computer processors (106). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes an application (110), module lists (112), tagged values (114), and taint flows (116). In one or more embodiments, the application (110) is a collection of source code. The application (110) may include a collection of computer instructions written in a programming language, or intermediate representation (e.g., byte code). In one or more embodiments, the collection of computer instructions may construct and/or reference various objects.

In one or more embodiments, the application (110) includes modules (122A, 122N). In one or more embodiments, a module (122A) is an independent unit of source code. Programming entities defined within a module (122A) may be imported by other modules. For example, the programming entities may be functions, constructors, constants, variables, objects, etc. When a first module imports a second module (e.g., a library module), the first module may be said to be dependent on the second, imported module.

In one or more embodiments, module lists (112) are lists of module names that indicate how the corresponding modules (122A, 122N) are to be processed by the code analyzer (104). Examples of module lists (112) include: 1) a to-be-analyzed list (124), indicating modules (122A, 122N) to be analyzed precisely during a static analysis; 2) a blacklisted list (126), indicating modules (122A, 122N) that should not be included in the to-be-analyzed list (124); and 3) a possibly tainted list (128), indicating modules (122A, 122N) that may include source locations (134A, 134N) and/or sink locations (136A, 136N) of taint flows (116).

In one or more embodiments, taint flows (116) include source locations (134A, 134N) and sink locations (136A, 136N). Each source location (134A) and each sink location (136A) may be a line number in the source code of the application (110). In one or more embodiments, source locations (134A, 134N) and sink locations (136A, 136N) correspond to program points (e.g., statements) in the application (110).

Each taint flow (116) may correspond to the flow of a tainted value from a source location (134A) to a sink location (136A). A source location (134A) may be where attacker-controllable input external to the application (110) is received. For example, a source location (134A) may correspond to a statement that calls an application program interface (API). Thus, any value received at a source location (134A) may be considered to be potentially tainted (e.g., unsafe) and may correspond to a potential security vulnerability in the application (110).

In one or more embodiments, a sink location (136A) is where a security-sensitive operation is performed (e.g., via a function call). For example, the security-sensitive operation may access a security-sensitive resource of the computer system (100) that requires an elevated privilege for access. In one or more embodiments, the sink location (136A) may access the security-sensitive operation via an API.

In one or more embodiments, tagged values (114) assign tags (132A, 132N) to abstract values (130A, 130N) and/or objects. In one or more embodiments, a tag (132A) includes information that may be used by the code analyzer (104) while performing a static analysis of the application (110).

In one or more embodiments, each abstract value (130A, 130N) corresponds to a set of concrete values. An abstract value (130A) may correspond to a set of concrete values that may be assigned to a variable during the execution of the application (110). Examples of abstract values (130A, 130N) for integers include: any integer, any positive integer, any even integer, any odd integer, any nonzero integer, a set of specific integers, etc. Examples of abstract values (130A, 130N) for strings include: any string, any non-empty string, a specific string, a set of specific strings, numerical strings, non-numerical strings, etc. For example, the abstract value $T_{number}$ represents any number and the abstract value $T_{string}$ represents any string. As another example, an abstract integer value may be abstracted as the sign of the integer value (e.g., if it is important to determine whether the integer value can be negative). As yet another example, an abstract value may correspond to a range of concrete integer values. In addition, the abstract string values "number" and "not a number" may be useful in disambiguating between types of string values (e.g., between string values that denote a number vs. string values that do not denote a number).

Figure 1B:
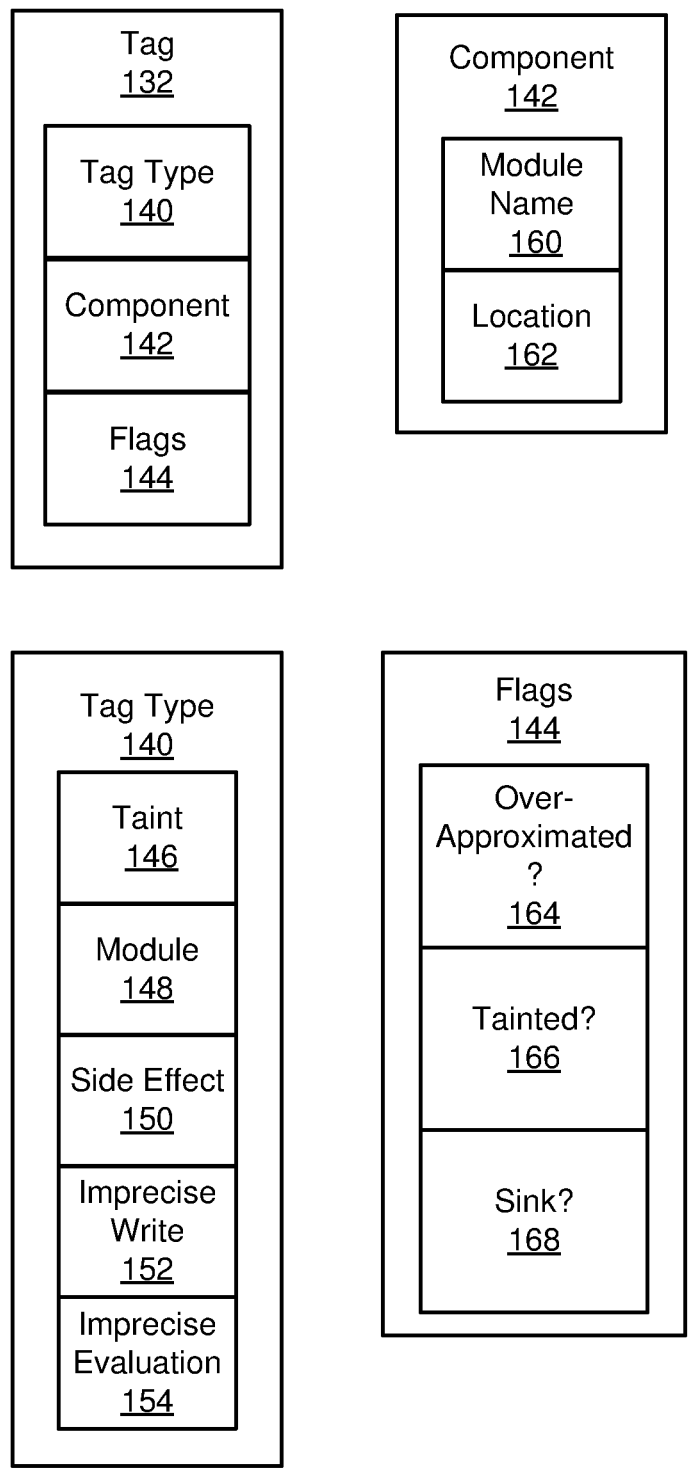

Turning to FIG. 1B, in one or more embodiments, a tag (132) includes a tag type (140), a component (142), and flags (144). The tag type (140) may be taint (146), module (148), side effect (150), imprecise write (152), imprecise evaluation (154), or some other type of tag. In one or more embodiments, the component (142) includes a module name (160) and/or a location (162). In one or more embodiments, the module name (160) is the name of a module (122A). In one or more embodiments, the location (162) is a line number in the source code of the application (110). For example, the location (162) may correspond to a statement in the application (110).

In one or more embodiments, a tag type of taint (146) indicates that the corresponding component (142) is a potential taint source. For example, the component (142) may include a source location (134A) of a taint flow (116).

In one or more embodiments, a tag type of module (148) indicates that the corresponding component (142) is the module name (160) of a module (122A) that has been over-approximated. Thus, the module (122A) may be responsible for providing an over-approximated value. For example, the over-approximated value may be the return value of a function defined in the module (122A). The over-approximated value may be any abstract value that corresponds to a set of concrete values. For example, the over-approximated value may be the universal abstract value, denoted by T, which may be defined as the abstract value that includes all possible concrete values. In one or more embodiments, all of the functions and properties exported by an over-approximated module are over-approximated.

In one or more embodiments, a tag type of side effect (150) indicates that the corresponding component (142) includes a module name (160) of a module (122A) that may be responsible for modifying an abstract value. For example, the abstract value may be assigned to an argument of an over-approximated function (e.g., defined by the module (122A) identified by the module name (160)) whose side effects have been ignored. Continuing this example, if the over-approximated function sets a property of one of its arguments, the effect of setting the property may be ignored by the static analysis. The component (142) of a tag (132) whose tag type is side effect (150) may also include a location (162) of the argument of the over-approximated function in the source code of the application (110).

In one or more embodiments, a tag type of imprecise write (152) indicates that the corresponding component (142) includes a module name (160) of a module (122A) that may be responsible for over-approximating a property of an object into which the abstract value corresponding to the tag (132) is written. For example, the imprecise write may be expressed as object[property]=value, where the property name is over-approximated (e.g., by the universal abstract value). However, due to the over-approximation (e.g., imprecision), the name of the property is unknown. The component (142) of a tag (132) whose tag type is imprecise write (152) may also include a location (162) where the imprecise write occurs in the source code of the application (110).

In one or more embodiments, a tag type of imprecise evaluation (154) indicates that the corresponding component (142) includes a location (162) corresponding to an over-approximated value in the source code of the application (110). The over-approximated value may be used as an argument in a call to an evaluation function (e.g., the eval function used in JavaScript and other programming languages) that evaluates its argument(s) and returns a result. For example, the over-approximated value may be a return value of an over-approximated function or may be derived from a return value of an over-approximated function.

In one or more embodiments, the flags (144) may be over-approximated? (164), tainted? (166), sink? (168), and/or some other flag. In one or more embodiments, the flag over-approximated? (164) indicates whether the corresponding component (142) has been over-approximated. For example, the corresponding component (142) may be a module (122A) that has been over-approximated. In one or more embodiments, the flag tainted? (166) indicates whether the corresponding component (142) is a potential taint source. For example, the corresponding component (142) may be a module (122A) that includes a source location (134A) in a taint flow (116). In one or more embodiments, the flag sink? (168) indicates whether the corresponding component (142) is a potential sink. For example, the corresponding component (142) may be a module (122A) that includes a sink location (136A) in a taint flow (116).

Returning to FIG. 1A, in one or more embodiments, the code analyzer (104) may be implemented in hardware (e.g., circuitry), software, firmware, and/or any combination thereof. In one or more embodiments, the code analyzer (104) includes functionality to perform a static analysis of the application (110). In one or more embodiments, the static analysis is a method of analyzing the application (110) without executing the application (110). For example, the goal of the static analysis may be to identify potential coding defects, security flaws, and/or malicious code. In one or more embodiments, the static analysis is performed using abstract interpretation. Abstract interpretation is a static analysis technique that over-approximates the behavior of an application (110), enabling the code analyzer (104) to check whether the application (110) can exhibit malicious behavior under any possible execution, without directly executing the application (110).

In one or more embodiments, the static analysis analyzes abstract states associated with statements in the application (110). Each abstract state may assign an abstract value (130A) to a memory address associated with a statement. For example, the memory address may correspond to a variable, pointer, etc. In one or more embodiments, the memory address is an abstract memory address that corresponds to an abstract object in an abstract heap. For example, the abstract heap may map abstract objects to physical objects in a physical heap. In one or more embodiments, the physical heap may be an area of memory used for dynamic (e.g., runtime) memory allocation, such that blocks of memory may be allocated and freed in an arbitrary order. For example, the physical heap may store objects and arrays dynamically allocated by the application (110). In one or more embodiments, the physical heap is implemented using the non-persistent storage (504) and/or persistent storage (506) of FIG. 5A.

The code analyzer (104) may include functionality to modify the module lists (112) during the static analysis. The code analyzer (104) may include functionality to add a tag (132A) to an abstract value (130A) and/or an object during the static analysis. The code analyzer (104) may include functionality to over-approximate the functions and properties exported by an over-approximated module.

In one or more embodiments, the code analyzer (104) may include functionality to track the amount of time spent analyzing a module during an iteration of the static analysis. The code analyzer (104) may include functionality to track the number of locations in the source code of the application (110) that read a specific abstract value (130A). For example, the abstract value (130A) may correspond to a tag (132A) whose tag type is "imprecise write". The code analyzer (104) may include functionality to track errors (e.g., type errors) caused by a specific abstract value (130A) corresponding to a tag (132A) whose tag type is "side effect".

In one or more embodiments, the code analyzer (104) may be included as part of a compiler (not shown). The compiler may include functionality to return taint flows (116) as part of the compilation output.

In one or more embodiments, the computer processor (106) includes functionality to execute the application (110). In one or more embodiments, the computer processor (106) includes functionality to execute the code analyzer (104).

While FIG. 1A and FIG. 1B show a configuration of components, other configurations may be used without departing from the scope of the invention. For example, various components may be combined to create a single component. As another example, the functionality performed by a single component may be performed by two or more components.

Figure 2:
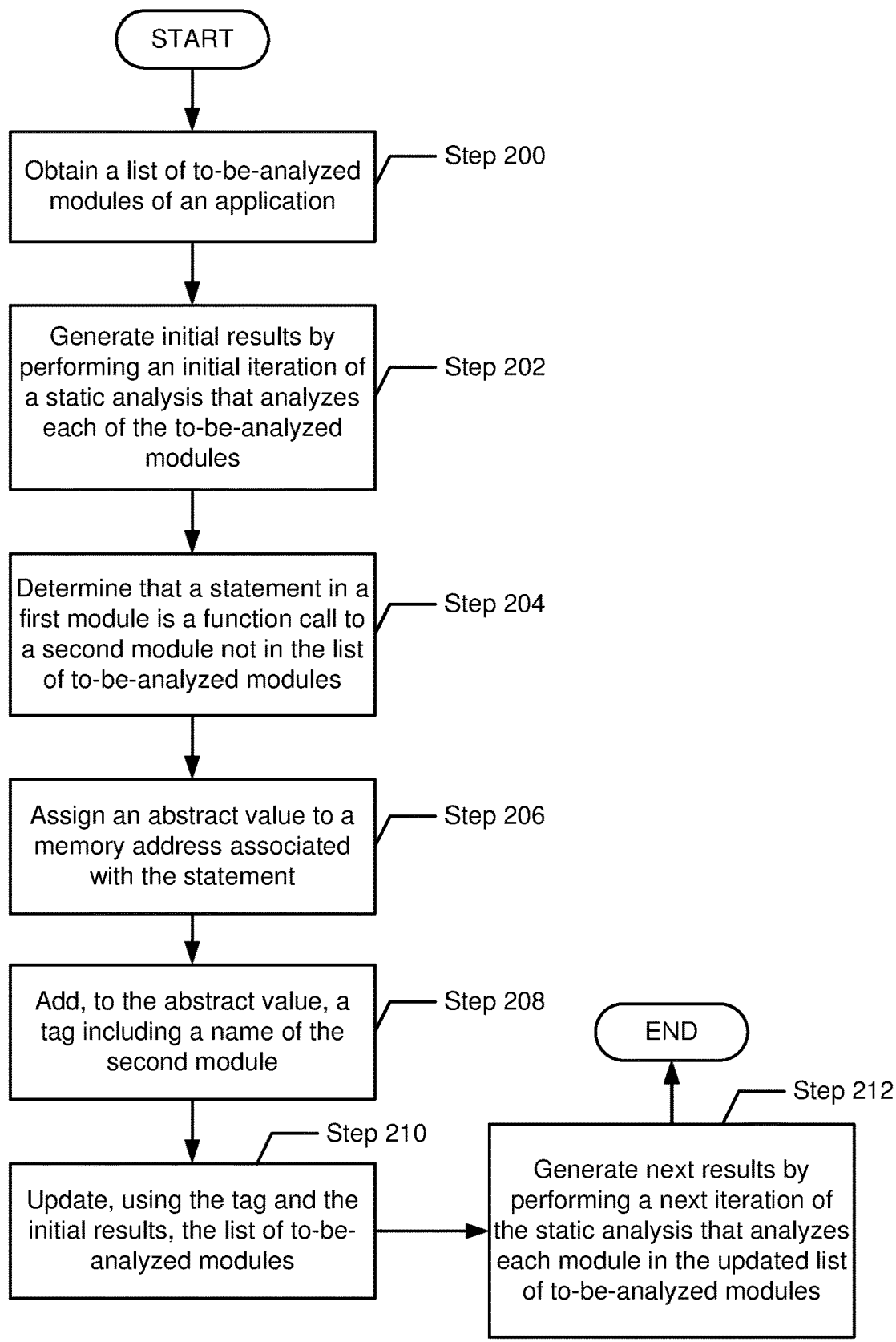
FIG. 2, FIG. 3A, FIG. 3B, and FIG. 3C show flowcharts in accordance with one or more embodiments of the invention.

FIG. 2 shows a flowchart in accordance with one or more embodiments of the invention. The flowchart depicts a process for feedback-directed static analysis. One or more of the steps in FIG. 2 may be performed by the components (e.g., the code analyzer (104) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a list of to-be-analyzed modules of an application is obtained. The list of to-be-analyzed modules may include the names of modules to be analyzed precisely during a static analysis. In one or more embodiments, the list of to-be-analyzed modules is obtained from a user. In one or more embodiments, the list of to-be-analyzed modules is initialized to the modules of the application, excluding third-party modules (e.g., library modules) imported by the application.

In one or more embodiments, a list of blacklisted modules that are not to be analyzed is obtained (e.g., from a user). For example, the list of blacklisted modules may include third-party modules that are known to be trusted (e.g., and thus need not be analyzed for taint flows).

In one or more embodiments, the code analyzer generates a list of possibly tainted modules by performing a syntactic analysis of the modules of the application. For example, the syntactic analysis may identify statements that call functions that are included in a list of known potential taint sources and/or sinks.

In Step 202, initial results are generated by performing an initial iteration of a static analysis that analyzes each module in the list of to-be-analyzed modules. In one or more embodiments, modules of the application whose names are not in the list of to-be-analyzed modules are not analyzed during the initial iteration of the static analysis.

In one or more embodiments, the initial results include possible taint flows.

The code analyzer may generate the taint flows during the static analysis by detecting, using the list of possibly tainted modules, flows from source locations to sink locations in the application. The code analyzer may use the taint flows to determine how to update the list of to-be-analyzed modules, as described below in Step 380 and Step 382 of FIG. 3C.

In one or more embodiments, the initial results include errors detected during the initial iteration. For example, type errors may be detected when an abstract value (e.g., an over-approximated abstract value) is inconsistent with a type of value expected by the code analyzer. Continuing this example, the type error may be an attempt to call a non-function object. The code analyzer may use the presence of type errors to determine how to update the list of to-be-analyzed modules, as described below in Step 376 and Step 378 of FIG. 3C.

In one or more embodiments, the initial results include a count of the number of locations in the source code of the application that read a specific abstract value corresponding to an imprecise write tag. The code analyzer may use the count to determine how to update the list of to-be-analyzed modules, as described below in Step 372 and Step 374 of FIG. 3C.

In Step 204, the initial iteration determines that a statement in a first module in the list of to-be-analyzed modules is a function call to a second module not in the list of to-be-analyzed modules. For example, the second module may be included in the list of blacklisted modules or may be an imported third-party module that was not included in the list of to-be-analyzed modules.

In Step 206, in response to the determination, the initial iteration assigns an abstract value to a memory address associated with the statement. In one or more embodiments, the abstract value may correspond to a return value, an argument, or a receiver object of the function call. The assigned abstract value may be an over-approximated return value of the function call. For example, the assigned abstract value may be over-approximated as the universal abstract value. In other words, a precise abstract value may be not available since the statement has been determined, in Step 204 above, to be a function call to a second module that has not been analyzed.

Alternatively, the assigned abstract value may be an argument of the call to the over-approximated function. Still alternatively, the assigned abstract value may be written to an over-approximated property of an object (e.g., a receiver object corresponding to the function call). In other words, the identity of the property may be imprecise (e.g., unknown) because the property name has been over-approximated. For example, the write to the property may be expressed as object [<over-approximated property>]=value.

In Step 208, a tag that includes a name of the second module is added to the abstract value. In one or more embodiments, the tag represents information that may be used by the code analyzer to determine how to update the list of to-be-analyzed modules.

In one or more embodiments, the tainted? flag of the tag is set to "true" when the second module includes a source location of a possible taint flow in the initial results (see description of Step 202 above). Similarly, the sink? flag of the tag may be set to "true" when the second module includes a sink location of a possible taint flow in the initial results. In addition, the over-approximated? flag of the tag may be set to "true" when the corresponding (i.e., tagged) abstract value is an over-approximated abstract value.

In one or more embodiments, the tag has a tag type of "module" indicating that the second module is responsible for providing an over-approximated abstract value. In one or more embodiments, the tag has a tag type of "imprecise write" when the corresponding abstract value is written to an over-approximated property of an object. In one or more embodiments, the tag has a tag type of "side effect" when the corresponding abstract value is an argument of a call to an over-approximated function. For example, the static analysis may ignore side effects of over-approximated functions, and the presence of the side effect tag may alert the code analyzer to the possibility that the corresponding abstract value was modified as a side effect of executing the over-approximated function.

In one or more embodiments, the tag has a tag type of "taint" when the abstract value corresponds to a known taint source (e.g., a taint source in one of the modules in the list of possibly tainted modules). In one or more embodiments, the tag has a tag type of "imprecise evaluation" when the abstract value is an argument in a call to an evaluation function, and the abstract value is a return value of an over-approximated function.

In Step 210, the list of to-be-analyzed modules is updated using the tag and the initial results. In one or more embodiments, to increase the precision of the static analysis, the code analyzer may add the second module to the list of to-be-analyzed modules. Alternatively, as an optimization to increase the efficiency of the static analysis, the code analyzer may remove a module from the list of to-be-analyzed modules. In one or more embodiments, the code analyzer may add the removed module to the list of blacklisted modules (see description of Step 352 and Step 354 of FIG. 3B below). See the descriptions of FIG. 3B and FIG. 3C below for details regarding how the list of to-be-analyzed modules may be updated.

In Step 212, next results are generated by performing a next iteration of the static analysis that analyzes each module in the updated list of to-be-analyzed modules (see description of Step 202 above).

In one or more embodiments, a performance optimization is applied to limit the number of times that an abstract state is visited during the static analysis. The purpose of the performance optimization is to increase the scope of coverage if the static analysis times out due to performing a computationally expensive analysis of the same abstract state during each successive iteration. In one or more embodiments, the code analyzer tracks the amount of time consumed during the static analysis. In addition, the code analyzer may track the number of times each abstract state has been analyzed during the multiple iterations of the static analysis. When the amount of time consumed by performing the static analysis exceeds a predetermined amount of time, the code analyzer may schedule the order in which the abstract states are analyzed based on the tracked number of times (i.e., the number of times that each abstract state has already been analyzed). For example, when the number of times that an abstract state has been analyzed exceeds a predetermined threshold number of times, the abstract state may be removed from an active worklist of abstract states and added to a suspended worklist. Continuing this example, once all the abstract states in the active worklist have been analyzed, the code analyzer may then analyze the abstract states in the suspended worklist. Thus, even when analyzing a specific abstract state causes the analysis to time out, it may still be possible for the analysis to provide useful results (e.g., identify potential taint flows), by deferring the analysis of some abstract states until the end of the analysis.

In one or more embodiments, instead of maintaining a separate suspended worklist, the code analyzer sorts the active worklist by the number of times that each abstract state has been analyzed. For example, abstract states that have been analyzed many times may be moved to the end of the active worklist.

Figure 3A:
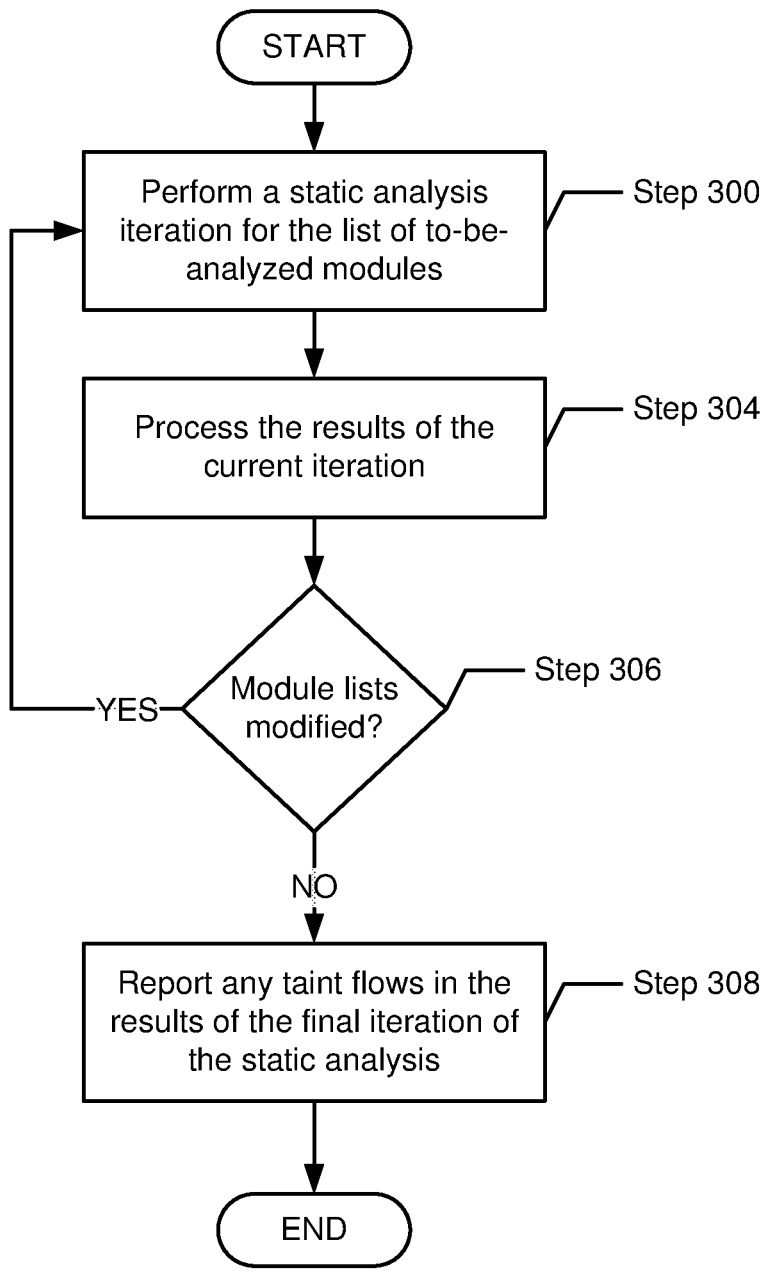

FIG. 3A shows a flowchart in accordance with one or more embodiments of the invention. The flowchart depicts a process for feedback-directed static analysis. One or more of the steps in FIG. 3A may be performed by the components (e.g., the code analyzer (104) of the computer system (100)), discussed above in reference to FIG. 1A. In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 300, an iteration of a static analysis is performed that analyzes each module in the list of to-be-analyzed modules (see descriptions of Step 202, Step 204, Step 206, and Step 208 above). For example, the iteration may, while analyzing statements in modules in the list of to-be-analyzed modules, assign abstract values to memory addresses that are reachable from source locations.

In one or more embodiments, the iteration may perform multiple passes through the list of to-be-analyzed modules until a fixed point is reached, where each module in the list of to-be-analyzed modules is analyzed during each pass. In one or more embodiments, the fixed point is reached when the abstract values assigned by the iteration during a current pass are unchanged relative to a previous pass.

In one or more embodiments, modules not in list of to-be-analyzed modules are over-approximated (i.e., not analyzed), and their side effects ignored. For example, when a function call in an over-approximated module adds a new property to an object passed as an argument, the side effect of adding the new property may be ignored, and thus the new property might not be resolvable.

In Step 304, the results of the current iteration are processed (see descriptions of FIG. 3B and FIG. 3C below).

If, in Step 306, it is determined that there are no modifications to the list of to-be-analyzed modules, or to the list of blacklisted modules, then in Step 308 any taint flows included in the results of the current iteration of the static analysis are reported. For example, the results of earlier iterations of the static analysis that preceded the current iteration may contain false positives due to the over-approximation of modules, resulting in an imprecise taint flow analysis. See description of Step 380 and Step 382 of FIG. 3C below. Otherwise, if Step 306 determines that there are changes to the list of to-be-analyzed modules, or to the list of blacklisted modules, the code analyzer performs another iteration of the static analysis, and again executes the processing loop formed by Step 300, Step 304, and Step 306 above.

Figure 3B:
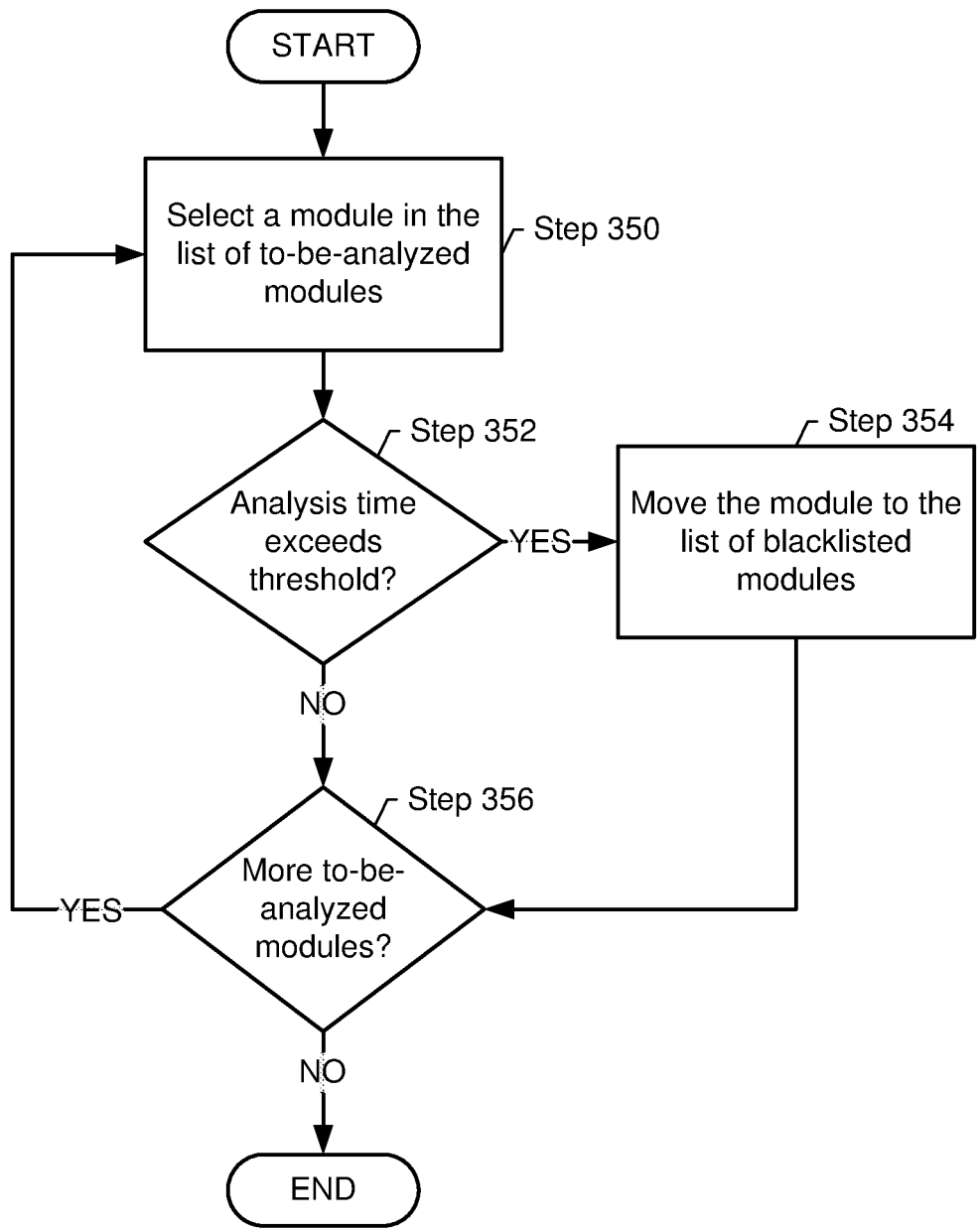

FIG. 3B shows a flowchart in accordance with one or more embodiments of the invention. The flowchart depicts a process for feedback-directed static analysis. One or more of the steps in FIG. 3B may be performed by the components (e.g., the code analyzer (104) of the computer system (100)), discussed above in reference to FIG. 1A. In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 350, a module in the list of to-be-analyzed modules is selected. For example, each of the modules in the list of to-be-analyzed modules may be selected in successive executions of Step 350.

If, in Step 352, it is determined that an amount of time spent analyzing the selected module during the current iteration of the static analysis exceeds a predetermined percentage of the total amount of time spent performing the current iteration of the static analysis, then in Step 354 the module is removed from the list of to-be-analyzed modules and added to the list of blacklisted modules. In other words, the selected module has been determined to satisfy a blacklist criterion based on the percentage of the time spent performing the current iteration that is attributable to analyzing the selected module. In one or more embodiments, the code analyzer tracks the amount of time consumed analyzing each module during each iteration of the static analysis.

If, in Step 356, it is determined that there are more modules that have not yet been selected in the list of to-be-analyzed modules, then the code analyzer again executes Step 350 above to select the next module in the list of to-be-analyzed modules.

Figure 3C:
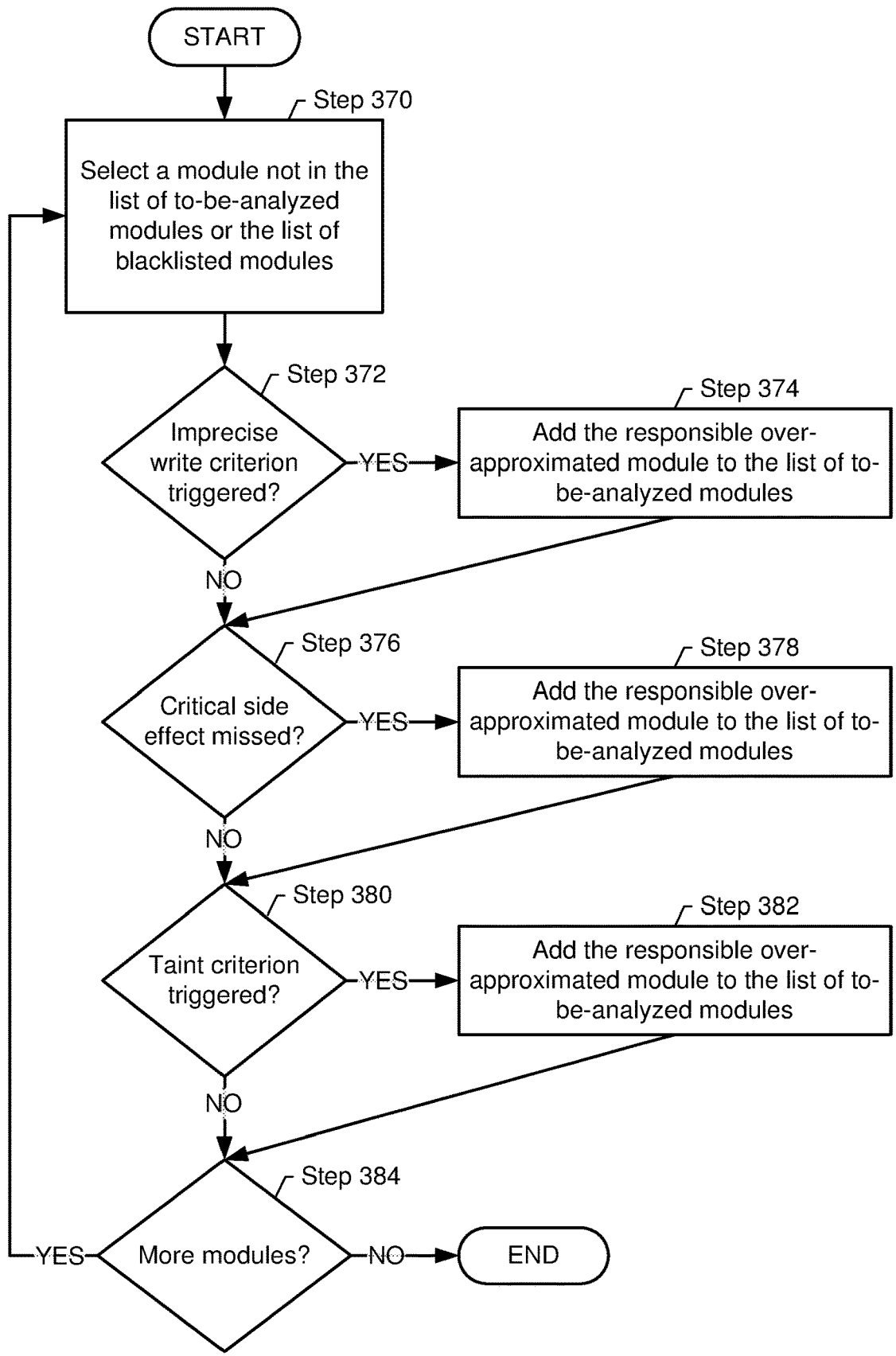

FIG. 3C shows a flowchart in accordance with one or more embodiments of the invention. The flowchart depicts a process for feedback-directed static analysis. One or more of the steps in FIG. 3C may be performed by the components (e.g., the code analyzer (104) of the computer system (100)), discussed above in reference to FIG. 1A. In one or more embodiments of the invention, one or more of the steps shown in FIG. 3C may be omitted, repeated, and/or performed in parallel, or in a different order than the order shown in FIG. 3C. Accordingly, the scope of the invention should not be considered limited to the specific arrangement of steps shown in FIG. 3C.

Initially, in Step 370, a module not in the list of to-be-analyzed modules or the list of blacklisted modules is processed, using the results of the current iteration (see description of Step 304 above). For example, there may be several modules of the application (e.g., third-party modules or modules imported from a library) that are not included in either the list of to-be-analyzed modules or the list of blacklisted modules.

If, in Step 372, it is determined that an imprecise write criterion has been triggered, then in Step 374 the over-approximated module responsible for the over-approximated abstract value that identifies the property in the imprecise write is added to the list of to-be-analyzed modules. However, the over-approximated module may not be added to the list of to-be-analyzed modules if the over-approximated module is included in the list of blacklisted modules. In one or more embodiments, the imprecise write tag corresponding to the abstract value indicates the module responsible for the over-approximated property. The code analyzer may determine that the imprecise write criterion has been triggered when a number of locations in the application that read an abstract value tagged with an imprecise write tag exceeds a predetermined threshold. For example, if 5 locations in the application read an abstract value tagged with an imprecise write tag, and the predetermined threshold is 3, then the imprecise write criterion will be triggered. Multiple "imprecise reads" of imprecisely written values may cause a critical loss of precision in the static analysis. Thus, adding the responsible module to the list of to-be-analyzed modules may increase the precision of the next iteration of the static analysis, so that the imprecise write may be avoided.

If, in Step 376, it is determined that a critical side effect has been missed, then in Step 378 the over-approximated module responsible for the side effect is added to the list of to-be-analyzed modules. The over-approximated module may not be added to the list of to-be-analyzed modules if the over-approximated module is included in the list of blacklisted modules. In one or more embodiments, the side effect tag corresponding to the abstract value indicates the module responsible for the side effect. The code analyzer may determine that a critical side effect has been missed by determining that an error (e.g., a type error due to attempting to call a non-function object) was caused by the static analysis ignoring a side effect to an abstract value. In other words, the abstract value may have been modified as a side effect of executing a function defined in an over-approximated module, as indicated by the presence of a side effect tag on the abstract value. Thus, adding the responsible module to the list of to-be-analyzed modules may increase the precision of the next iteration of the static analysis, so that the side effect due to executing the over-approximated function may be precisely analyzed.

If, in Step 380, it is determined that a taint criterion has been triggered, then in Step 382 the over-approximated module responsible for the abstract value that triggered the taint criterion is added to the list of to-be-analyzed modules. The over-approximated module may not be added to the list of to-be-analyzed modules if the over-approximated module is included in the list of blacklisted modules. In one or more embodiments, the module tag corresponding to the abstract value that triggered the taint criterion indicates the module responsible for providing the abstract value. In one or more embodiments, the code analyzer determines that the taint criterion has been triggered when the following conditions are satisfied:

1) the over-approximated module includes a function f that is over-approximated or has an over-approximated argument, 2) f includes is a sink (e.g., according to the syntactic analysis to identify taint sources and sinks, as described in Step 200 above) or includes a sink location of a taint flow, and 3) f's over-approximated abstract values are tainted (e.g., as indicated by tags added to the abstract values).

In other words, when the taint criterion is satisfied, greater precision may be required for the static analysis to determine whether a taint flow involving the function f actually exists or represents a false positive. The additional precision may be achieved by adding the over-approximated module to the list of to-be-analyzed modules, so that the over-approximated module can be precisely analyzed in the next iteration of the static analysis.

If, in Step 384, it is determined that there are more modules that have not yet been selected that are not in the list of to-be-analyzed modules or the list of blacklisted modules, then the code analyzer again executes Step 370 above to select the next module.

Figure 4:
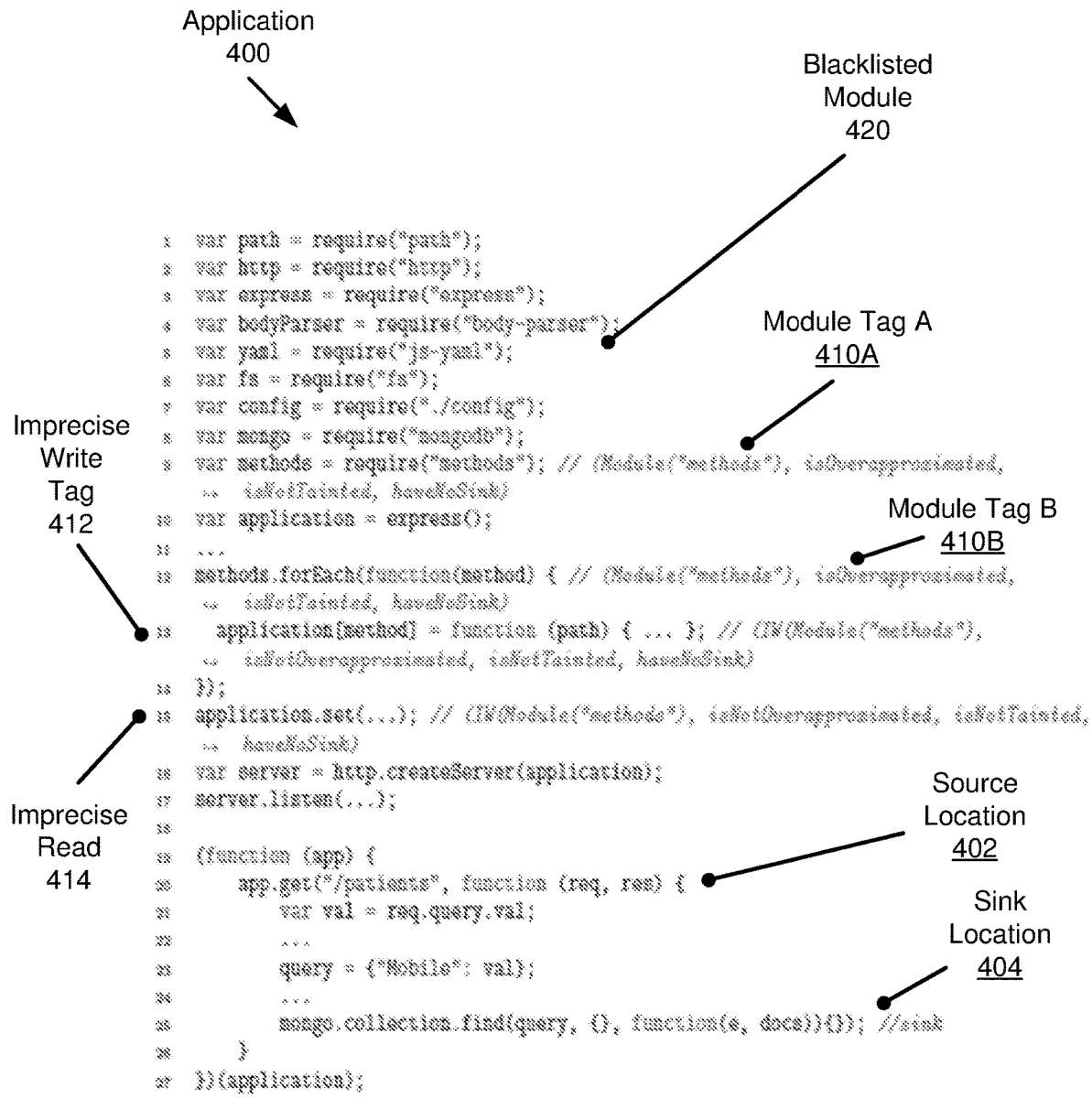
FIG. 4 shows an example in accordance with one or more embodiments of the invention.

The following example is for explanatory purposes only and not intended to limit the scope of the invention. FIG. 4 shows an implementation example in accordance with one or more embodiments of the invention. The code snippet in FIG. 4 shows a simplified Node.js application (400) ((110) in FIG. 1A) based on the Express framework that is vulnerable to a NoSQL injection attack. NoSQL, which stands for Not Only SQL, is a common term for nonrelational databases, in which queries and data may be represented in JavaScript Object Notation (JSON).

The code analyzer ((104) in FIG. 1A) obtains a list of source and sink functions (e.g., MongoDB query functions for NoSQL injection vulnerabilities), and performs a syntactic analysis to determine the list of possibly tainted modules ((128) in FIG. 1A) that may contain a taint source or sink. The list of blacklisted modules ((126) in FIG. 1A) initially includes a single module, mongodb, that the user has determined does not require precise analysis. The list of to-be-analyzed modules ((124) in FIG. 1A) is initially empty. Although built-in modules are not explicitly included in the list of to-be-analyzed modules, built-in modules are not over-approximated. Thus, the built-in modules "hap", "path", and "fs" are not over-approximated.

Express is a web framework that provides Hypertext Transfer Protocol (HTTP) utility methods and middleware to build Node.js web applications. In this example, the Express framework is instantiated and configured at lines 10 and 15, respectively. All the node package manager (NPM) and built-in modules are imported between lines 1 and 9. At line 12, the methods module is used to set and implement HTTP verbs such as put and get to serve HTTP requests by the Express application. Finally, an HTTP server is created at line 16 and starts listening for HTTP requests at line 17.

In this example, an attacker may craft a JSON object and send it as input through an HTTP request received at a source location (402) ((134A) in FIG. 1A) at line 20. The JSON object may then bypass the condition in the query at a sink location (404) ((136A) in FIG. 1A) at line 25 to gain access to the records of all patients in the database.

When an HTTP request (req) is received at the source location (402), it is passed to the application from the middleware. HTTP requests may be controlled by the attacker, hence req is a taint source. The query.yal property of req is used at the sink location (404), through the variable query, to query the MongoDB database, a NoSQL database imported at line 8. The application (400) is vulnerable because a tainted value from the source location (402) is passed as an argument to mongo.collection.find, which had been previously identified as a sink location (404) based on the syntactic analysis to determine the list of possibly tainted modules.

During the initial iteration of the static analysis, the code analyzer over-approximates all the imported third-party modules, and analyzes the modules in the list of to-be-analyzed modules. The methods module, which is not in the list of to-be-analyzed modules, is over-approximated in the initial iteration. The methods module is not tainted, does not contain any sinks, and all of the functions and properties exported by the methods module are over-approximated. The code analyzer adds module tag A (410A) and module tag B (410B) to the abstract values assigned at line 9 and line 12 of the application (400). The module tags (410A,410B) include the name of the methods module since the abstract values correspond to over-approximated functions of the methods module. For example, the calls to the callback function passed as an argument to methods.forEach at line 12 are over-approximated.

The code analyzer also adds an imprecise write tag (412) to the abstract value assigned at line 13, since the abstract value is written to an over-approximated property of the application object. The code analyzer notices that an imprecise read (414) of function (path) occurs at line 15 due to the imprecise write at line 13. In this example, the code analyzer also notices that function (path) is called at 4 other locations in the application (400). Since, in this example, the threshold number of reads of an imprecise write had been set to 3, then an imprecise write criterion is triggered. The imprecise write tag (412) indicates that the methods module is the cause of the imprecision, hence the methods module is added to the list of to-be-analyzed modules, so that the next iteration of the static analysis will analyze the methods module precisely, and thus replace the imprecise write with a "precise" write.

The code analyzer also notices that a taint criterion is triggered for the express module, due to the following conditions being satisfied. Note that all exported functions of the express module are over-approximated because the express module is not in the list of to-be-analyzed modules.

1) the express module includes a function that is over-approximated, at the source location (402).

2) the function contains a sink, namely the call to mongo.collection.find, which was previously identified as a sink location (404).

3) the function has tainted over-approximated values, for example, req and query.

The code analyzer identifies the express module as responsible for the tainted over-approximated value req, and adds the express module to the list of to-be-analyzed modules. Thus, the express module is analyzed in the next iteration of the static analysis. Similarly, the module body-Parser is added to the list of to-be-analyzed modules in a subsequent iteration of the static analysis in response to detecting additional triggering of the taint criterion, imprecise write criterion and/or the detection of critical side effects. Thus, additional precision is incrementally added in subsequent iterations of the static analysis. In the final iteration of the static analysis, the code analyzer is able to precisely identify the taint flow between the source location (402) and the sink location (404).

In an alternate scenario, the module js-yaml imported on line 5 of the application (400), is initially included in the list of to-be-analyzed modules. However, the amount of time spent analyzing js-yaml exceeds a predetermined percentage of the amount of time spent performing the initial iteration, and thus the code analyzer determines that js-yaml should be a blacklisted module (420). The code analyzer removes js-yaml from the list of to-be-analyzed modules and adds js-yaml to the list of blacklisted modules. Thus, js-yaml is over-approximated in the next iteration of the static analysis.

Figure 5A:
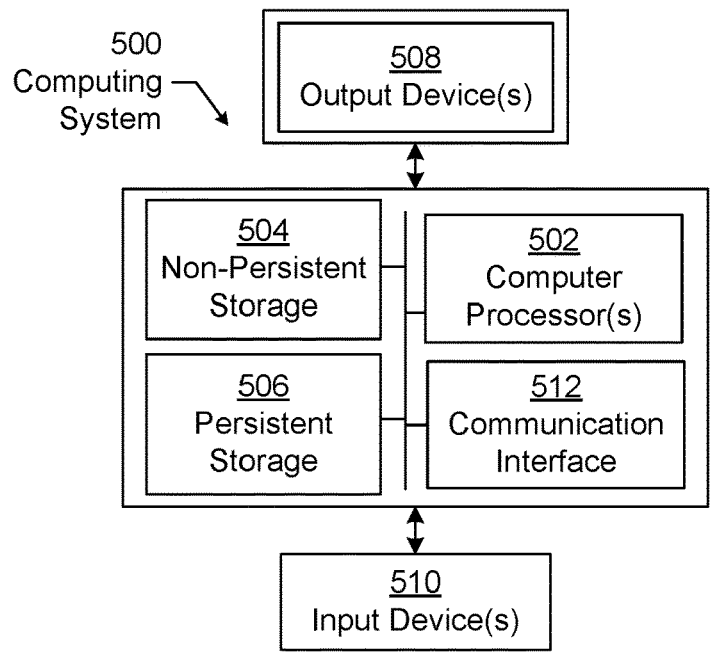
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
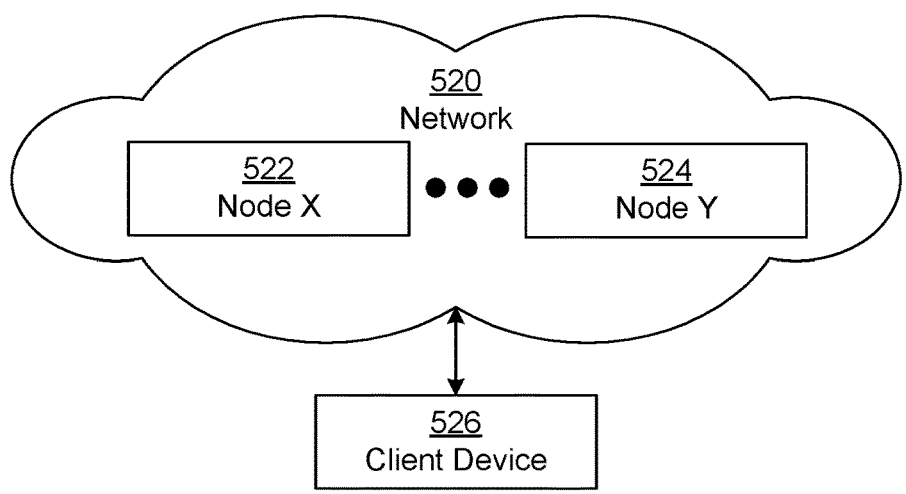

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
obtaining a list of to-be-analyzed modules of an application, the list of to-be-analyzed modules comprising a first module comprising a statement;
generating initial results by performing an initial iteration of a static analysis that analyzes each module in the list of to-be-analyzed modules;
determining, by the initial iteration, that the statement is a function call to a second module not in the list of to-be-analyzed modules;
in response determining that the statement is a function call to the second module, assigning, by the initial iteration, an abstract value to a memory address associated with the statement;
adding, to the abstract value, a tag comprising a name of the second module;
tracking an amount of time spent analyzing each module in the list of to-be-analyzed modules during the initial iteration of the static analysis;
determining that an amount of time spent analyzing a third module in the list of to-be-analyzed modules during the initial iteration exceeds a predetermined percentage of a total amount of time spent performing the initial iteration;
updating, using the tag and the initial results, the list of to-be-analyzed modules, wherein updating the list of to-be-analyzed modules further comprises: in response to determining that the amount of time spent analyzing the third module exceeds the predetermined percentage:
removing the third module from the list of to-be-analyzed modules, and
adding the third module to a list of blacklisted modules; and
generating next results by performing a next iteration of the static analysis that analyzes each module in the updated list of to-be-analyzed modules, wherein the next iteration does not analyze the third module.

2. The method of claim 1, wherein the static analysis analyzes abstract states, the method further comprising:
tracking a number of times that each of the abstract states has been analyzed during the static analysis;
determining that performing the static analysis has exceeded a predetermined amount of time; and
scheduling the order in which the abstract states are analyzed based on the tracked number of times corresponding to each of the abstract states.

3. The method of claim 1,
wherein the second module is not in the list of blacklisted modules,
wherein the abstract value is written to an over-approximated property of an object,
wherein the method further comprises determining that a number of locations in the application that read the abstract value exceeds a predetermined threshold,
wherein updating the list of to-be-analyzed modules further comprises: in response to determining that the number of locations in the application that read the abstract value exceeds the predetermined threshold, adding the second module to the list of to-be-analyzed modules, and
wherein the next iteration analyzes the second module.

4. The method of claim 1, further comprising:
determining that the abstract value is a cause of an error,
wherein updating the list of to-be-analyzed modules further comprises: in response to determining that the abstract value is a cause of the error, adding the second module to the list of to-be-analyzed modules, wherein the next iteration analyzes the second module.

5. The method of claim 1, further comprising:
determining that the abstract value satisfies a taint criterion,
wherein updating the list of to-be-analyzed modules further comprises: in response to determining that the abstract value satisfies the taint criterion, adding the second module to the list of to-be-analyzed modules, wherein the next iteration analyzes the second module.

6. The method of claim 1, wherein the initial results comprise taint flows, the method further comprising:
generating a report comprising the taint flows,
wherein each of the taint flows:
comprises a source location in the application and a sink location in the application, and
corresponds to a security vulnerability in the application.

7. A system, comprising:
a memory coupled to a computer processor;
a database configured to store:
a list of to-be-analyzed modules of an application, the list of to-be-analyzed modules comprising a first module comprising a statement,
a second module not in the list of to-be-analyzed modules,
an abstract value, and
a tag comprising a name of the second module, and
a software code analyzer, executing on the computer processor and using the memory, configured to:
generate initial results by performing an initial iteration of a static analysis that analyzes each module in the list of to-be-analyzed modules,
determine, by the initial iteration, that the statement is a function call to the second module,
in response to determining that the statement is a function call to the second module, assign, by the initial iteration, the abstract value to a memory address associated with the statement,
add the tag to the abstract value,
track an amount of time spent analyzing each module in the list of to-be-analyzed modules during the initial iteration of the static analysis,
determine that an amount of time spent analyzing a third module in the list of to-be-analyzed modules during the initial iteration exceeds a predetermined percentage of a total amount of time spent performing the initial iteration,
update, using the tag and the initial results, the list of to-be-analyzed modules, wherein updating the list of to-be-analyzed modules further comprises: in response to determining that the amount of time spent analyzing the third module exceeds the predetermined percentage:
removing the third module from the list of to-be-analyzed modules, and adding the third module to a list of blacklisted modules, and generate next results by performing a next iteration of the static analysis that analyzes each module in the updated list of to-be-analyzed modules, wherein the next iteration does not analyze the third module.

8. The system of claim 7, wherein the static analysis analyzes abstract states, and wherein the software code analyzer is further configured to:
track a number of times that each of the abstract states has been analyzed during the static analysis,
determine that performing the static analysis has exceeded a predetermined amount of time, and
schedule the order in which the abstract states are analyzed based on the tracked number of times corresponding to each of the abstract states.

9. The system of claim 7,
wherein the second module is not in the list of blacklisted modules,
wherein the abstract value is written to an over-approximated property of an object,
wherein the software code analyzer is further configured to determine that a number of locations in the application that read the abstract value exceeds a predetermined threshold,
wherein updating the list of to-be-analyzed modules further comprises: in response to determining that the number of locations in the application that read the abstract value exceeds the predetermined threshold, adding the second module to the list of to-be-analyzed modules, and
wherein the next iteration analyzes the second module.

10. The system of claim 7, wherein the software code analyzer is further configured to:
determine that the abstract value is a cause of an error,
wherein updating the list of to-be-analyzed modules further comprises: in response to determining that the abstract value is the cause of the error, adding the second module to the list of to-be-analyzed modules, wherein the next iteration analyzes the second module.

11. The system of claim 7, wherein the software code analyzer is further configured to:
determine that the abstract value satisfies a taint criterion,
wherein updating the list of to-be-analyzed modules further comprises: in response to determining that the abstract value satisfies the taint criterion, adding the second module to the list of to-be-analyzed modules, wherein the next iteration analyzes the second module.

12. The system of claim 7, wherein the initial results comprise taint flows, and wherein the software code analyzer is further configured to:
generating a report comprising the taint flows,
wherein each of the taint flows:
comprises a source location in the application and a sink location in the application, and
corresponds to a security vulnerability in the application.

13. A non-transitory computer readable medium comprising instructions that, when executed by a computer processor, perform:
obtaining a list of to-be-analyzed modules of an application, the list of to-be-analyzed modules comprising a first module comprising a statement;
generating initial results by performing an initial iteration of a static analysis that analyzes each module in the list of to-be-analyzed modules;

determining, by the initial iteration, that the statement is a function call to a second module not in the list of to-be-analyzed modules;
in response to determining that the statement is a function call to the second module, assigning, by the initial iteration, an abstract value to a memory address associated with the statement;
adding, to the abstract value, a tag comprising a name of the second module;
tracking an amount of time spent analyzing each module in the list of to-be-analyzed modules during the initial iteration of the static analysis;
determining that an amount of time spent analyzing a third module in the list of to-be-analyzed modules during the initial iteration exceeds a predetermined percentage of a total amount of time spent performing the initial iteration;
updating, using the tag and the initial results, the list of to-be-analyzed modules, wherein updating the list of to-be-analyzed modules further comprises: in response to determining that the amount of time spent analyzing the third module exceeds the predetermined percentage:
removing the third module from the list of to-be-analyzed modules, and
adding the third module to a list of blacklisted modules; and
generating next results by performing a next iteration of the static analysis that analyzes each module in the updated list of to-be-analyzed modules, wherein the next iteration does not analyze the third module.

14. The non-transitory computer readable medium of claim 13, wherein the static analysis analyzes abstract states, further comprising instructions that perform:
tracking a number of times that each of the abstract states has been analyzed during the static analysis;
determining that performing the static analysis has exceeded a predetermined amount of time; and
scheduling the order in which the abstract states are analyzed based on the tracked number of times corresponding to each of the abstract states.

15. The non-transitory computer readable medium of claim 13, further comprising instructions that perform:
determining that a number of locations in the application that read the abstract value exceeds a predetermined threshold,
wherein the second module is not in the list of blacklisted modules,
wherein the abstract value is written to an over-approximated property of an object,
wherein updating the list of to-be-analyzed modules further comprises: in response to determining that the number of locations in the application that read the abstract value exceeds the predetermined threshold, adding the second module to the list of to-be-analyzed modules, and
wherein the next iteration analyzes the second module.

16. The non-transitory computer readable medium of claim 13, further comprising instructions that perform:
determining that the abstract value is a cause of an error,
wherein updating the list of to-be-analyzed modules further comprises: in response to determining that the abstract value is a cause of the error, adding the second module to the list of to-be-analyzed modules, wherein the next iteration analyzes the second module.

17. The non-transitory computer readable medium of claim 13, further comprising instructions that perform:

determining that the abstract value satisfies a taint criterion,
wherein updating the list of to-be-analyzed modules further comprises: in response to determining that the abstract value satisfies the taint criterion, adding the second module to the list of to-be-analyzed modules, wherein the next iteration analyzes the second module.

\* \* \* \* \*

UNITED STATES PATENT AND TRADEMARK OFFICE
CERTIFICATE OF CORRECTION

PATENT NO. : 10,783,245 B2
APPLICATION NO. : 16/206562
DATED : September 22, 2020
INVENTOR(S) : Behnaz Hassanshahi et al.

Page 1 of 1

It is certified that error appears in the above-identified patent and that said Letters Patent is hereby corrected as shown below:

In the Claims

Claim 1, Column 17, Line 23, the word -- to -- should be inserted between the words "response" and "determining".

Claim 7, Column 19, Line 3, the word "generate" should read -- generating --.

Claim 12, Column 19, Line 52, the word "generating" should read -- generate --.

Signed and Sealed this
Fifth Day of January, 2021

Andrei Iancu
*Director of the United States Patent and Trademark Office*